US009658688B2

(12) United States Patent
Shen et al.

(10) Patent No.: US 9,658,688 B2
(45) Date of Patent: May 23, 2017

(54) AUTOMATIC VIEW ADJUSTMENT

(71) Applicant: Microsoft Corporation, Redmond, WA (US)

(72) Inventors: Guobin Shen, Beijing (CN); Liqun Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 14/054,111

(22) Filed: Oct. 15, 2013

(65) Prior Publication Data
US 2015/0102995 A1    Apr. 16, 2015

(51) Int. Cl.
*G06F 3/01* (2006.01)
*G06F 3/00* (2006.01)
*G06F 1/32* (2006.01)
*G09G 5/00* (2006.01)

(52) U.S. Cl.
CPC ............ *G06F 3/013* (2013.01); *G06F 1/3231* (2013.01); *G06F 3/005* (2013.01); *G06F 3/017* (2013.01); *G09G 5/00* (2013.01); *G09G 2340/04* (2013.01); *G09G 2340/14* (2013.01); *G09G 2354/00* (2013.01); *G09G 2360/144* (2013.01); *Y02B 60/1289* (2013.01)

(58) Field of Classification Search
CPC ....... G06T 3/00; G06T 3/0093; G06F 1/3231; G06F 3/005; G06F 3/017; G09G 5/00
See application file for complete search history.

(56) References Cited

U.S. PATENT DOCUMENTS

| | | | |
|---|---|---|---|
| 5,841,439 A * | 11/1998 | Pose | G06T 15/005 345/418 |
| 6,424,351 B1 * | 7/2002 | Bishop | G06T 15/04 345/427 |
| 6,643,413 B1 * | 11/2003 | Shum | G06T 3/4007 345/629 |
| 7,002,551 B2 * | 2/2006 | Azuma | G03B 13/28 345/158 |
| 7,203,911 B2 | 4/2007 | Williams | |
| 7,460,150 B1 * | 12/2008 | Coughlan | H04N 7/147 348/14.01 |
| 7,623,105 B2 | 11/2009 | Li et al. | |

(Continued)

OTHER PUBLICATIONS

Android Face Detector, retrieved on Jun. 13, 2013 at <<http://developer.android.com/reference/android/media/FaceDetector.html>> 3 pages.

(Continued)

*Primary Examiner* — Amare Mengistu
*Assistant Examiner* — Crystal A Mathews
(74) *Attorney, Agent, or Firm* — Lee & Hayes, PLLC

(57) ABSTRACT

A view adjustment system using information captured by one or more sensors on a client device determines a projection direction for content to be displayed on a display of the client device. Upon determining the projection direction, the view adjustment system transforms the content into a perspective view based on the determined projection direction and prompts the client device to present the content in the perspective view to a user. The view adjustment system may monitor changes in relative position and/or direction of the user with respect to the display, adjust the projection direction, and transform the content to reflect these changes.

19 Claims, 7 Drawing Sheets

(56) References Cited

U.S. PATENT DOCUMENTS

| | | | | |
|---|---|---|---|---|
| 8,159,551 | B2* | 4/2012 | Katz | G06F 1/3203 348/222.1 |
| 2002/0175896 | A1* | 11/2002 | Vaananen | G06F 1/1626 345/158 |
| 2002/0186217 | A1* | 12/2002 | Kamata et al. | 345/427 |
| 2005/0265619 | A1* | 12/2005 | Ozaki | G06T 3/0018 382/254 |
| 2006/0132675 | A1* | 6/2006 | Choi | G06F 1/1626 349/76 |
| 2006/0268014 | A1* | 11/2006 | Song et al. | 345/647 |
| 2007/0070092 | A1 | 3/2007 | Oh et al. | |
| 2008/0186390 | A1* | 8/2008 | Sato | G06T 3/4053 348/222.1 |
| 2009/0115783 | A1* | 5/2009 | Eichenlaub | 345/421 |
| 2010/0009308 | A1* | 1/2010 | Wen | A61C 7/08 433/24 |
| 2010/0060667 | A1 | 3/2010 | Chen et al. | |
| 2010/0317332 | A1* | 12/2010 | Bathiche | H04L 12/282 455/418 |
| 2011/0122130 | A1* | 5/2011 | Vesely et al. | 345/419 |
| 2011/0187706 | A1* | 8/2011 | Vesely et al. | 345/419 |
| 2011/0195782 | A1* | 8/2011 | Mao | G06F 3/0304 463/37 |
| 2011/0273613 | A1 | 11/2011 | Chavez et al. | |
| 2012/0113114 | A1* | 5/2012 | Liu | 345/419 |
| 2012/0162204 | A1* | 6/2012 | Vesely et al. | 345/419 |
| 2012/0162214 | A1* | 6/2012 | Chavez et al. | 345/419 |
| 2012/0229513 | A1* | 9/2012 | Hayashi et al. | 345/649 |
| 2012/0314899 | A1 | 12/2012 | Cohen et al. | |
| 2013/0063340 | A1* | 3/2013 | Mondragon | G09G 5/00 345/156 |
| 2013/0222646 | A1* | 8/2013 | Tsubota | H04N 5/23293 348/239 |
| 2013/0339764 | A1* | 12/2013 | Lee | G06F 1/3206 713/300 |
| 2014/0152558 | A1* | 6/2014 | Salter | G06F 3/013 345/157 |
| 2014/0184502 | A1* | 7/2014 | Liu | G06F 3/0346 345/158 |
| 2014/0222436 | A1* | 8/2014 | Binder | G06F 3/167 704/275 |
| 2014/0225887 | A1* | 8/2014 | Aguirre-Valencia | 345/419 |

OTHER PUBLICATIONS

Bradski, "The OpenCV Library," Dr. Dobb's Journal of Software Tools, 2000, 7 pages.

Carroll et al., "Optimizing Content-Preserving Projections for Wide-Angle Images," Aug. 2009, Proceedings: In ACM Transaction on Graphics, vol. 28, Issue 3, 10 pages.

Cheng et al., "iRotate: Automatic Screen Rotation based on Face Orientation," May 5, 2012, In Proceedings of the SIGCHI Conference on Human Factors in Computing Systems, retrieved at <<http://xman.tw/data/iRotate.pdf>> 8 pages.

Euler Angles, retrieved on Jun. 10, 2013 at <<http://mathworld.wolfram.com/EulerAngles.html>> 4 pages.

Hadid et al., "Face and Eye Detection for Person Authentication in Mobile Phones," Sep. 25, 2007, In First ACM/IEEE International Conference on Distributed Smart Cameras, retrieved at <<http://ieeexplore.ieee.org/stamp/stamp.jsp?tp=&arnumber=4357512>> 8 pages.

Han et al., "EyeGuardian: A Framework of Eye Tracking and Blink Detection for Mobile Device Users," Feb. 28, 2012, In Twelfth Workshop on Mobile Computing Systems and Applications, Article No. 6, retrieved at <<http://www.hotmobile.org/2012/papers/HotMobile12-final72.pdf>> 6 pages.

Kannala et al., "A Generic Camera Model and Calibration Method for Conventional, Wide-Angle, and Fish-Eye Lenses," Aug. 2006, In Journal of IEEE Transactions on Pattern Analysis and Machine Intelligence , vol. 28, Issue 8, retrieved at <<http://www.ee.oulu.fi/~jkannala/publications/tpami2006.pdf>> 15 pages.

Kim et al., "An Efficient Correction Method of Wide-Angle Lens Distortion for Surveillance Systems," May 24, 2009, Proceedings: In IEEE International Symposium on Circuits and Systems, retrieved at <<http://ieeexplore.ieee.org/stamp/stamp.jsp?tp=&arnumber=5118485>> 4 pages.

Li et al., "A Reliable and Accurate Indoor Localization Method Using Phone Inertial Sensors," Sep. 5, 2012, In Proceedings of the ACM Conference on Ubiquitous Computing, retrieved at <<http://research.microsoft.com/en-us/um/people/zhao/pubs/ubicomp12_IndoorNav.pdf>> 10 pages.

LiKimWa et al., "Can Your Smartphone Infer Your Mood?" Nov. 1, 2011, retrieved at <<http://www.ruf.rice.edu/~mobile/publications/likamwa11phonesense.pdf>> 5 pages.

Microsoft Research Face SDK Beta, retrieved on Jun. 10, 2013, at <<http://research.microsoft.com/en-us/projects/facesdk/>> 2 pages.

Miluzzo et al., "EyePhone: Activating Mobile Phones With Your Eyes," Aug. 30, 2010, In the Second ACM SIGCOMM Workshop on Networking, Systems, and Applications on Mobile Handhelds, retrieved at <<http://www.cs.dartmouth.edu/~campbell/papers/eyephone.pdf>> 6 pages.

Olloclip, retrieved on Jun. 10, 2013 at <<http://www.olloclip.com/>> 2 pages.

Priyantha et al., "Little Rock: Enabling Energy Efficient Continuous Sensing on Mobile Phones," Apr. 2011, In IEEE Pervasive Computing, vol. 10, Issue 2, retrieved at <<http://research.microsoft.com/pubs/120316/LittleRock_TR.pdf>> 12 pages.

Ra et al., "Improving Energy Efficiency of Personal Sensing Applications with Heterogeneous Multi-Processors," Sep. 5, 2012, In Proceedings of the ACM Conference on Ubiquitous Computing, retrieved at <<http://research.microsoft.com/pubs/164428/MultiProc-ubicomp12.pdf>> 10 pages.

Samsung. Galaxy S3 Smart Stay, retrieved on Jun. 11, 2013, at <<http://www.samsung.com/global/galaxys3/smartstay.html>> 2 pages.

Truong, "Low Power Consumption and a Competitive Price Tag Make the Six-Core TMS320C6472 Ideal for High-Performance Applications," retrieved on Jun. 11, 2013 at <<http://www.ti.com/lit/wp/spry130/spry130.pdf>> In White Paper of Texas Instruments, 9 pages.

Yuan et al., "Automatic Exposure Correction of Consumer Photographs," Oct. 7, 2012, In Proceedings of the 12th European Conference on Computer Vision, vol. Part IV, retrieved at <<http://research.microsoft.com/en-us/um/people/jiansun/papers/ECCV12_AutoExposure.pdf>> 14 pages.

Zelnik-Manor et al., "Squaring the Circle in Panoramas," Oct. 17, 2005, In the Tenth IEEE International Conference on Computer Vision, vol. 2, retrieved at <<http://www.vision.caltech.edu/lihi/Publications/zelnik-panoramas.pdf>> 8 pages.

Zhang et al., "A Survey of Recent Advances in Face Detection," Jun. 2010, In Technical Report of MSR-TR-2010-66, retrieved at <<http://202.114.89.42/resource/pdf/6582.pdf>> 17 pages.

Zorin et al., "Correction of Geometric Perceptual Distortions in Pictures," Aug. 6, 1995, In Proceedings of the 22nd Annual Conference on Computer Graphics and Interactive Techniques, retrieved at <<http://mrl.nyu.edu/~dzorin/papers/zorin1995cgp.pdf>> 8 pages.

* cited by examiner

AUTOMATIC VIEW ADJUSTMENT

BACKGROUND

When viewing content displayed on a display of a device, a user usually needs to position himself/herself or adjust the display accordingly in order to view the content in a normal direction. It is because viewing the content (such as text, image, etc.) at a slanted angle from the display usually renders the content in a distorted or squeezed form or shape that may make the content to become unfamiliar and/or small for the user to recognize. However, the user may not always be able to re-position himself/herself and/or adjust the display of the device when viewing the content presented on the display. This is especially true when the user is occupied by other tasks and/or the user does not have a free hand to alter an orientation and/or position of the device. In those situations, the user may be compelled to accept the poor viewing condition and read the distorted or squeezed content presented on the display.

SUMMARY

This application describes example embodiments of automatic view adjustment. In various embodiments, an automatic view adjustment system estimates or determines an angle of view or a line of sight between a user and a display of a device. Upon estimating the angle of view or the line of sight, the automatic view adjustment system may transform content displayed on the display of the device into a perspective view that is based on the estimated angle of view or the estimated line of sight. Thereafter, the automatic view adjustment system may configure the device to present the transformed content in the perspective view to the user.

This summary introduces simplified concepts of view adjustment, which are further described below in the Detailed Description. This summary is not intended to identify essential features of the claimed subject matter, nor is it intended for use in limiting the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
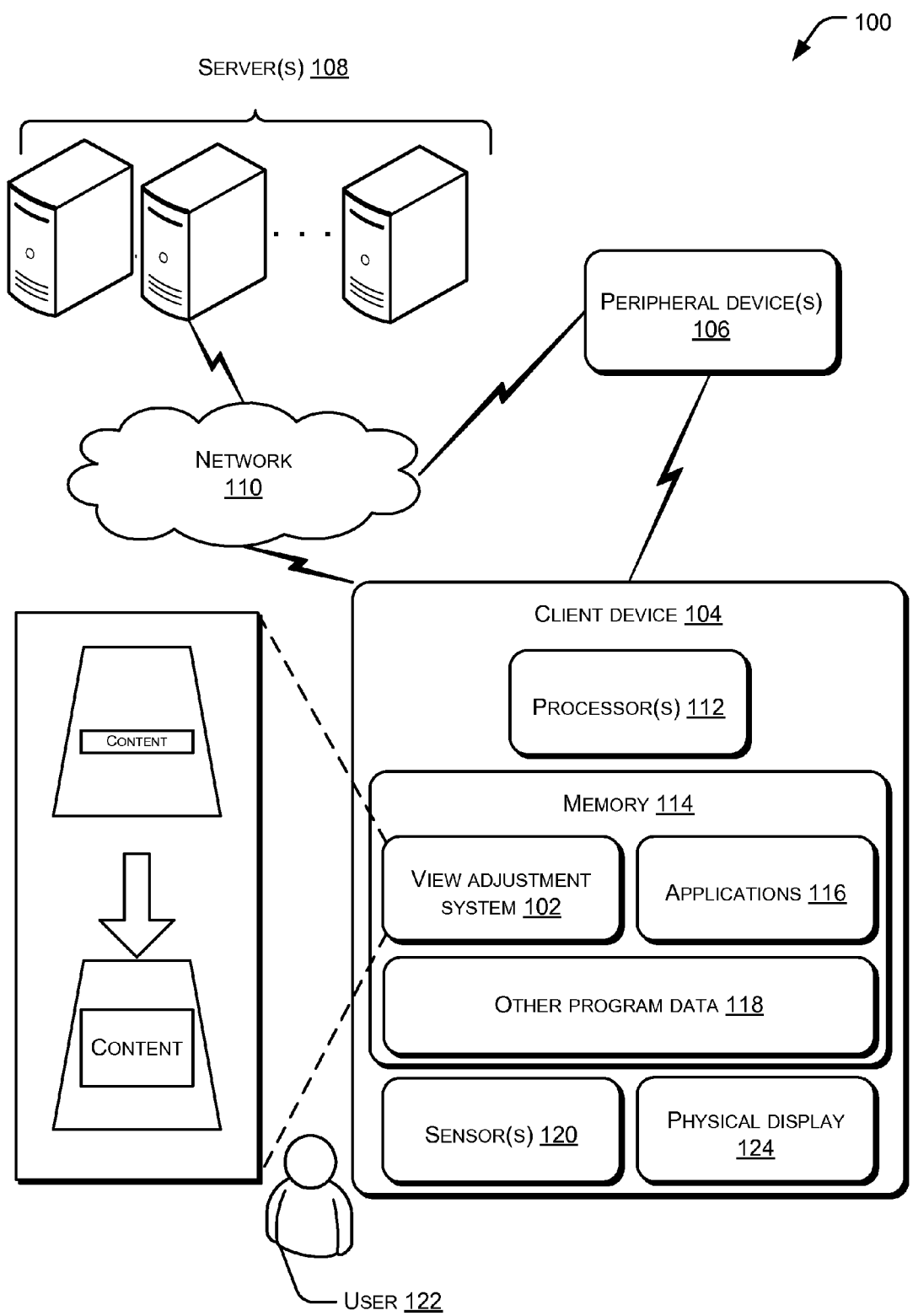
FIG. 1 illustrates an example environment of a view adjustment system.

As noted above, the viewing quality deteriorates as a user views content presented on a display (or screen) of a device from a direction away from the normal of the display. The normal of the display corresponds to a vector that is perpendicular to a surface of the display. This situation becomes even worse when the user views the content from a direction that the content, such as, the text, appears upside down, for example. If the user is occupied with other tasks and/or does not have a free hand to move the device, the user may be forced to accept the distorted or squeezed view of the content.

This disclosure describes a view adjustment system. The view adjustment system estimates or determines a direction to which content displayed on a display of a device is to be projected and transforms the content into a perspective view (e.g., a frontal view, etc.) based on the estimated or determined direction. The perspective view of the content is projected on a two-dimensional plane that is perpendicular to the estimated or determined direction, which is an estimated direction of the line of sight between a user and the display of the device. The view adjustment system may estimate or determine this direction with or without direct user input or interaction.

In at least one embodiment, the view adjustment system may remain in an idle or standby mode, and is activated in response to detecting or being woken up by a triggering event. The triggering event may include, for example, a display of a device being turned on, a user being within a predefined proximity of the display or the device, a change in an amount of light incident on the display or the device, receiving new content to be displayed, a change in a posture or position of a user relative to the display or device, etc. Additionally or alternatively, if the view adjustment system is in an active mode, e.g., when the display has been turned on, the view adjustment system may employ one or more low-power sensors, such as a light sensor, a proximity sensor, an inertial measurement unit (IMU) sensor, etc., for detecting possible changes in an angle of view or line of sight between the user and the display.

Upon activation, the view adjustment system may determine a projection direction to which content displayed (and/or to be displayed) on the display of the device is to be projected. In at least one embodiment, the view adjustment system may determine the projection direction based on a visual detection algorithm, a voice detection algorithm and/or a motion detection algorithm, etc., with or without direct user input or interaction. The projection direction may include, but is not limited to, a direction substantially or approximately representing a line of sight or a direction substantially or approximately corresponding to an angle of view between the user and the display or the device. A line of sight corresponds to a line joining a center between two eyes and a specific point on the display or the device. The specific point may include, for example, a center of the display or the device, a center of the content displayed or to be displayed on the display of the device. An angle of view corresponds to a set of one or more angles that define the line of sight between the user and the display or the device.

In some embodiments, the projection direction may alternatively include an estimation of a direction corresponding to a relative position or direction of the user with respect to the display of the device. In this case, the view adjustment system may estimate a relative position or direction of a body part of the user (e.g., a position of the user's head) with respect to the display of the device, and determine the projection direction based on the estimated position or direction without further determining a line of sight or an angle of view between the user and the display of the device. Employing an approximate estimation can alleviate the view adjustment system from performing complicated or intensive computation for determining the line of sight or the angle of view of the user, while still providing a perspective view of the content that is closer to the line of sight of the user than an original view of the content. In some instances, given the processing power and/or the detection capabilities of the device, performing complicated or intensive computation for determining the line of sight or the angle of view of the user may not be feasible, and determining the estimated position or direction without further determining the line of sight or the angle of view between the user and the display or the device may occur using estimation. Additionally or alternatively, upon estimating the position of the body part of the user, the view adjustment system may further estimate the line of sight and/or the angle of view of the user based on, for example, a face or body model, which may simplify estimation of the line of sight and/or the angle of view of the user if direct detection of the line of sight and/or the angle of view of the user based on information of a sensor may not be available.

In response to determining the projection direction, the view adjustment system may transform or project the content currently displayed and/or to be displayed into a perspective view based on the determined projection direction. The view adjustment system may then configure the device to present the transformed content in the perspective view on the display. The perspective view of the content is projected on a two-dimensional plane that is perpendicular to the projection direction, which is an estimated direction of the line of sight between the user and the display of the device.

In some instances, the view adjustment system may further monitor, track or detect a change in a viewing condition of the user. The change in the viewing condition may include, for example, a change in a line of sight or an angle of view due to, e.g., a relative movement, such as a displacement and/or rotation, between the user and the device, a change in an operation mode of the display and/or the device, etc. The view adjustment system may determine whether a new projection direction is to be determined based on the change in the viewing condition, and present the content in a new perspective view if a new projection direction is determined. By way of example and not limitation, the view adjustment system may determine a new projection direction if the change in the viewing condition is greater than or equal to a predetermined threshold. For example, the device may be a mobile device such as a mobile phone. The view adjustment system may set the predetermined threshold to be a certain orientation change, e.g., ten degrees, fifteen degree, etc., of the mobile phone that can be detected via an accelerometer of the mobile phone, for example. For another example, device may be a television equipped with a motion detector. The view adjustment system may set the predetermined threshold to be a certain amount of motion or location change, such as half meter, one meter, etc., of the user detected via the motion detector. The view adjustment system may use this predetermined threshold to control a rate at which the view adjustment system responds to changes in the viewing condition. For example, the view adjustment system may adaptively or continuously adjust the projection direction and present the content in a plane perpendicular to the projection direction if the predetermined threshold is set to be zero. In other instances, in order to avoid a flickering effect due to frequent changes in the projection direction, and the corresponding perspective view, the view adjustment system may set the predetermined threshold greater than zero (e.g., a line of sight or an angle of view of the user being changed by three degrees, five degrees, eight degrees, ten degrees, twenty degrees, etc.).

The described view adjustment system estimates or determines a direction to which content displayed on a screen or display of a device is to be projected and transforms the content into a perspective view based on the estimated or determined direction. The view adjustment system may then configure the device to present the transformed content in the perspective view to a user.

In the examples described herein, the view adjustment system detects a triggering event for view adjustment, determines a projection direction to which content displayed on a display of a device is to be projected, transforms the content into a perspective view based on the determined projection direction, and monitors or tracks changes in viewing conditions of a user. However, in other embodiments, these functions may be performed by one or more services. For example, in at least one embodiment, a detection service may detect a triggering event for view adjustment, while a determination service may determine a projection direction to which content displayed on a display of a device is to be projected. A transformation service may transform the content into a perspective view based on the determined projection direction, and a monitoring service may monitor or track changes in viewing conditions of a user.

Furthermore, although in the examples described herein, the view adjustment system may be implemented as software and/or hardware installed in a single device or as a service, in other embodiments, the view adjustment system may be implemented in a plurality of devices and/or services provided in one or more servers over a network and/or distributed in a cloud computing architecture.

The application describes multiple and varied implementations and embodiments. The following section describes an example framework that is suitable for practicing various implementations. Next, the application describes example systems, devices, and processes for implementing a view adjustment system.

Example Environment

FIG. 1 illustrates an example environment 100 usable to implement a view adjustment system. The environment 100 may include a view adjustment system 102. In this example, the view adjustment system 102 is described as included in a client device 104. In some instances, the environment 100 may further include one or more peripheral device(s) 106 including input/output peripheral device(s). The peripheral device(s) 106 may be connected to or included in the client device 104. For example, the peripheral device(s) 106 may be an accessory device that is attachable to and/or removable from the client device 104 such as a keyboard, mouse, microphone, camera, printer, display, speakers, projector, another computing device, or another device having processing power and/or detection capabilities, etc.

Although in this example, the view adjustment system 102 is described to be included in the client device 104, in other instances, the view adjustment system 102 may be included in a peripheral device 106. Additionally or alternatively, the view adjustment system 102 may be included in and/or distributed among one or more server(s) 108, which communicate data with the client device 104 and/or the peripheral device 106 via a network 110. Additionally or alternatively, in some embodiments, the functions of the view adjustment system 102 may be included in and/or distributed among the client device 104 and one or more other entities, such as the peripheral device 106 and/or the servers 108. For example, the peripheral device 106 may include part of the functions of the view adjustment system 102 while other functions of the view adjustment system 102 may be included in the client device 104. Furthermore, in some embodiments, some or all the functions of the view adjustment system 102 may be included in a cloud computing system or architecture.

The client device 104 may be implemented as any of a variety of electronics devices that include, are associated with, or are connected to a display or screen. By way of example and not limitation, the client device 104 may be implemented as any of a variety of computing devices including, but not limited to, a mainframe computer, a notebook or portable computer, a handheld device, a netbook, an Internet appliance, a tablet or slate computer, a mobile device (e.g., a mobile phone, a personal digital assistant, a smart phone, etc.), a game console, a set-top box, etc., or a combination thereof. Additionally or alternatively, the client device 104 may be implemented as any of a variety of other consumer devices including, for example, a television, a projector or another display device. In some embodiments, the client device 104, e.g., a display device (such as a television), which has limited processing power and/or limited detection capabilities, may further be associated with or connected to a peripheral device 106 to obtain processing power and/or detection capabilities for the view adjustment system 102.

The network 110 may be a wireless or a wired network, or a combination thereof. The network 110 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

In at least one embodiment, the client device 104 (or the client device 104 with the peripheral device 106) may include one or more processors 112 coupled to memory 114. The one or more processors 112 may be implemented as one or more hardware processors including, for example, a microprocessor, an application-specific instruction-set processor, a graphics processing unit, a physics processing unit (PPU), a central processing unit (CPU), a graphics processing unit (GPU), a digital signal processor, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 114 may include one or more applications 116 (e.g., a web browser application, a text messaging application, a video player application, a power monitoring application, etc.) and other program data 118. The memory 114 may be coupled to, associated with, and/or accessible to other devices, such as network servers, routers, the peripheral device 106 and/or the other servers 108.

The memory 114 may include volatile memory, such as Random Access Memory (RAM) and/or non-volatile memory, such as read only memory (ROM) or flash RAM. The memory 114 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

In at least one embodiment, the client device 104 (and/or the peripheral device 106) may include one or more sensors 120. The one or more sensors may include, but are not limited to, an image sensor (such as a camera, an array of cameras, a fisheye camera, a wide field-of-view camera, an ultra-wide field-of-view camera, a limited-field-of-view camera etc.), a voice sensor (such as a microphone, an array of microphones, etc.), a motion sensor (such as an ultrasonic motion detector, a microwave motion detector, a passive (infrared) motion detector, a Kinect® motion controller, Wii MotionPlus®, PlayStation Move®, Leap Motion® Controller, etc.), a low-power sensor, a depth sensor, or a combination thereof, etc. Examples of the low-power sensor may include an inertial measurement unit (IMU) sensor (e.g., an accelerometer, a compass, etc.), a light sensor, a proximity sensor, etc.

A user 122 may use the client device 104 which displays content on a physical display 124 of the client device 104. The user 122 may view the content displayed on the physical display 124 from a certain direction or angle of view. The view adjustment system 102 may estimate or determine a current angle of view or a line of sight of the user 122 with respect to the physical display 124 via the one or more sensors 120. A line of sight may correspond to a line joining a center between a user's two eyes and a specific point on the physical display 124 or the client device 104. The specific point may include, for example, a center of the physical display 124 or the client device 104, a center of the content displayed or to be displayed on the physical display 124 of the client device 104. Meanwhile, an angle of view corresponds to a set of one or more angles that define the line of sight between the user 122 and the physical display 124 or the client device 104. The view adjustment system 102 may transform the content into a perspective view based on the estimated angle of view (or the estimated line of sight) of the user 122. The view adjustment system 102 may subsequently configure the client device 104 to present the content in the perspective view to the user 122.

Example View Adjustment System

Figure 2:
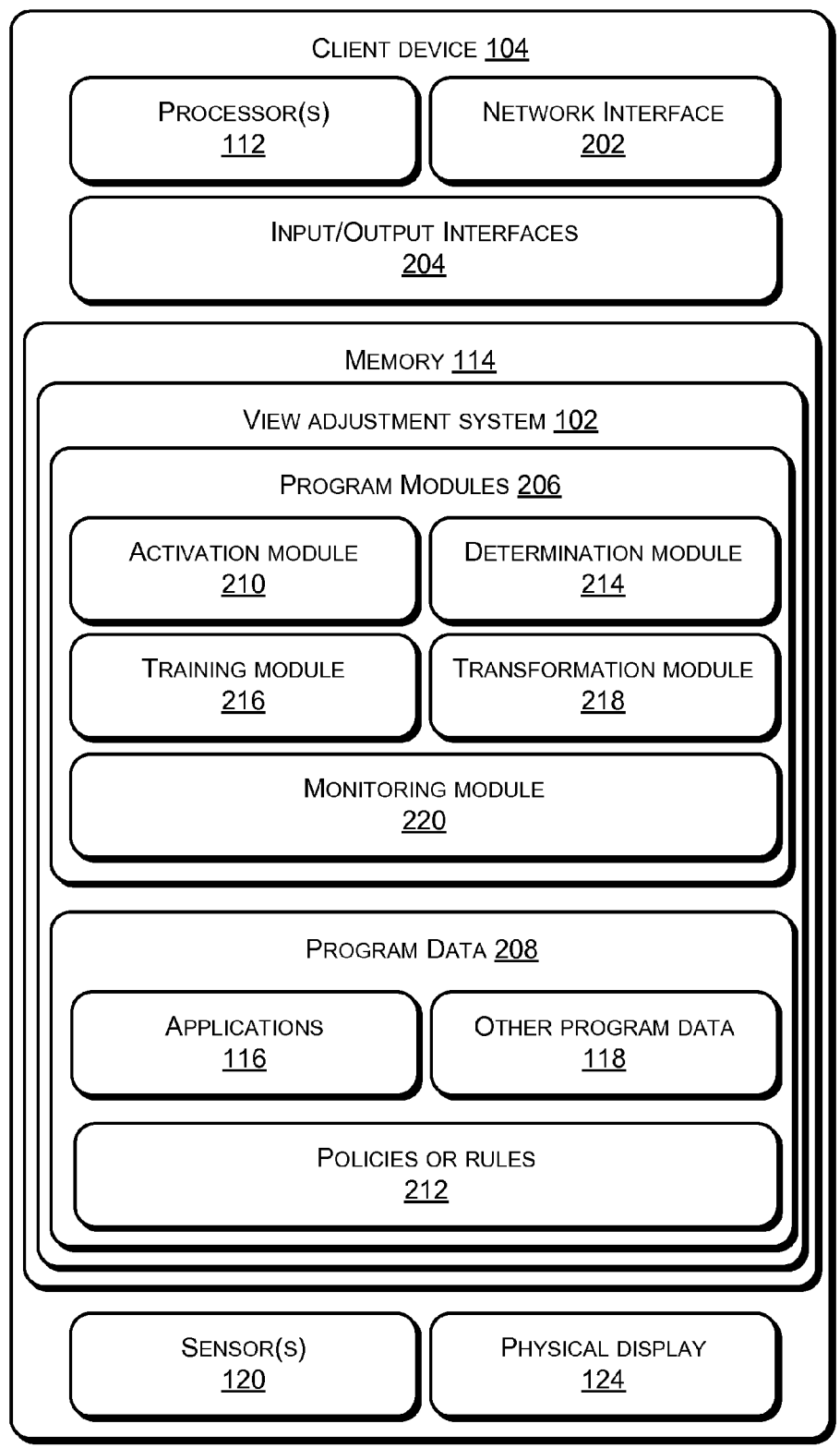
FIG. 2 illustrates the example view adjustment system as described in FIG. 1.

FIG. 2 illustrates an example view adjustment system 102 in more detail. In this example, the example view adjustment system 102 is described to be included in or part of a client device 104. Furthermore, for the sake of brevity, the client device 104 described hereinafter may correspond to a client device with or without a peripheral device attached or connected thereto, e.g., a computing device (such as a mobile phone, etc.), a display device (such as a television, etc.) having a peripheral device 106 attached or connected thereto, etc.

As described in the foregoing, the client device 104 may include, but is not limited to, one or more processors 112 and memory 114. Additionally, the client device 104 may further include one or more applications 116. In some embodiments, the client device 102 may further include a network interface 202 and an input/output interface 204. The one or more processors 112 are configured to execute instructions received from the network interface 202, received from the input/output interface 204, and/or stored in the memory 114. In at least one embodiment, the client device 102 further includes one or more sensors 120 and a physical display 124.

The view adjustment system 102 may include program modules 206 and program data 208. In at least one embodiment, the view adjustment system 102 may be operated in an "on" mode (e.g., an active mode) continuously or periodically. Alternatively, the view adjustment system 102 may be operated in an "on" mode upon demand and/or based on an event. In other instances, the view adjustment system 102 may be operated in an "off" mode (e.g., idle, standby, sleep, hibernation, airplane, or power saving mode) without actually being powered off, and may change from one mode (e.g., the off mode) to another mode (e.g., an "on" or active mode) in response to a triggering event.

In at least one instance, the view adjustment system 102 may include an activation module 210 which may be active or turned on when the physical display 124 and/or the client device 104 is/are turned on. Additionally or alternatively, the activation module 210 may be active regardless of whether the view adjustment system 102 is in an "off" mode or an "on" mode. In other instances, the activation module 210 may be inactive or in an "off" mode when the physical display 124 and/or the client device 104 is/are turned off or in a power saving mode, and is woken up when the physical display 124 and/or the client device 104 is/are turned on or change(s) from an "off" mode (e.g., a power saving mode, etc.) to an "on" mode.

In some embodiments, the activation module 210 of the view adjustment system 102 may be configured to determine whether a viewing event exists or likely exists via a low-power sensor of the one or more sensors 120 and/or other components (such as the application 116) of the client device 104, and filter out unlikely viewing events to avoid consumption of processing time and power for performing view adjustment while the user 122 is not currently viewing the physical display 124. In at least one embodiment, the low-power sensors may include sensors that consume a relatively low amount of power as compared to other sensors such as image sensors, audio sensors, etc. Examples of low-power sensors may include a light sensor, a proximity sensor, an accelerometer, a compass, etc. The low-power sensors and/or the other components of the client device 104 may detect an indication of a viewing condition and report the indication of the viewing condition to the activation module 210 for determining whether a viewing event exists or unlikely exists.

In at least one embodiment, detection of an unlikely viewing condition may include the physical display 124 or the client device 104 being currently turned off via the application 116 (e.g., a power monitoring application), no content pending to be displayed via the application 116, the physical display 124 or the client device 104 being placed close to a face/body of the user 122 via the proximity sensor and/or the light sensor, the physical display 124 or the client device 104 being placed in a dark area (such as a pocket, a purse, a dark room, etc.) via the light sensor, and/or the physical display 124 or the client device 104 being in a motion state via the accelerometer, etc. In response to determining that the viewing condition corresponds to an unlikely viewing condition, the activation module 210 may determine that a viewing event does not exist or is unlikely to exist, and then wait for a next incident (e.g., receiving new information from the low-power sensor regarding a possibility of a viewing event, etc.) to occur for determining whether a viewing event exists or likely exists.

In some embodiments, in response to determining that a viewing event may exist or likely exists, the activation module 210 may be further configured to detect or receive an indication of a triggering event. The triggering event may include the physical display 124 and/or the client device 104 being turned on or off, a change in an operation mode (e.g., from an idle or standby mode to an active mode or vice versa) of the client device 104 and/or the physical display 124, receiving content to be displayed on the physical display 124, a change in a position or posture of the user 122 relative to the client device 104 and/or the physical display 124, a change in a light intensity incident on the client device 104 and/or the physical display 124, detection of a voice of the user 122, a presence of the user 122 in proximity of the client device 104 and/or the physical display 124, etc.

In at least one embodiment, the activation module 210 may receive an active indication of the triggering event via the one or more sensors 120. For example, the activation module 210 may detect an indication of a triggering event (such as a presence of the user 122, a change in a position or posture of the user relative to the client device 104, etc.) by comparing images captured by an image sensor and/or motion captured by a motion sensor. Additionally or alternatively, the activation module 210 may detect an indication of a triggering event (such as a voice of the user 122) by detecting the speech of the user 122 using an acoustic sensor, e.g., a microphone. Additionally or alternatively, the activation module 210 may detect an indication of a triggering event (such as a change in light intensity incident on the client device 104) via a light sensor. Additionally or alternatively, the activation module 210 may detect an indication of a triggering event (such as a presence of the user 122 in proximity of the client device 104 and/or the physical display 124) via a proximity sensor, and/or a combination of any of the above described sensors.

Additionally or alternatively, the activation module 210 may receive a passive indication of a triggering event from other parts, such as an application 116, etc. of the client device 104. By way of example, the application 116, such as a text messaging application, may receive a new text message and may send an indication of receiving the new text message, which can be considered as a triggering event, to the activation module 210. As another example, when the physical display 124 is turned on, the client device 104, or an application 116, such as a power monitoring application, may send a notification to the activation module 210, indicating an occurrence of a change in an operation mode of the display 116 or the client device 104, which can be considered a triggering event.

Upon determining or receiving an indication of a triggering event, the activation module 210 may determine whether a demand or need for estimating or determining a projection direction, or an adjusted projection direction, is imminent based on the triggering event. In at least one embodiment, the view adjustment system 102 may include a set of policies or rules 212. The set of policies or rules 212 may include one or more criteria or conditions against which the activation module 210 may use to determine whether a demand or need for estimating or determining a projection direction or an adjusted projection direction is imminent based on the triggering event.

For example, one or more criteria or conditions may include, whether the physical display 124 or the client device 104 is turned on, whether an amount of light incident on the physical display 124 or the client device 124, as detected by the light sensor, for example, is greater than or equal to predetermined threshold (e.g., five lux, eight lux, ten lux, etc.), whether the user 122 is within a predetermined distance or proximity (e.g., 10 centimeter, 20 centimeter, 30 centimeter, etc.) of the physical display 124 or the client device 104, whether the physical display 124 or the client device 104 is in motion, quasi-stationary or stationary, and/or whether a new content is pending to be displayed, etc.

In at least one embodiment, the activation module 210 may further divide viewing situation or condition into two categories: "hand-held" and "off-the-body". The activation module 210 may categorize viewing conditions as "hand-held" and "off-the-body" if the physical display 124 or the client device 104 is in a quasi-stationary state and stationary state respectively as determined using the accelerometer, for example. In at least one embodiment, the activation module 210 may skip a viewing event or scenario without determining whether a projection direction or an adjusted projection direction is needed.

For example, Table 1 shows respective criteria or conditions included in the set of policies or rules for determining viewing conditions or scenarios that are of interest in each category of "hand-held" and "off-the-body" using a mobile device (such as a mobile phone) as an example of the client device 104. Based on the above, and as shown in Table 1, for example, the activation module 210 may determine that a demand or need for estimating or determining a projection direction or an adjusted projection direction is imminent if the criteria for a particular viewing condition are fulfilled.

TABLE 1

| Viewing Condition | State | Light Sensor | Proximity Sensor | Accelerometer |
|---|---|---|---|---|
| Hand-held | Display on | Nonzero (e.g., >20 lux) | Within a predetermined distance (e.g., >20 cm and <50 cm) | Quasi-stationary |
| Off-the-body | Display on or a pending prompt | Nonzero (e.g., >20 lux) | Within a predetermined distance (e.g., >20 cm and <50 cm) | Stationary |

In response to determining that a demand or need for estimating or determining a (projection direction or an adjusted projection direction is imminent, the activation module 210 may determine whether to change or maintain an operation mode of the view adjustment system 102. For example, the activation module 210 may change an operation mode of the view adjustment system 102 from an "off" mode to an "on" mode if the view adjustment system 102 is currently in the "off" mode, or maintain the operation mode of the view adjustment system 102 at an "on" mode if the view adjustment system 102 is currently in the "on" mode.

In some embodiments, the activation module 210 may receive or detect an explicit indication from the user 122 that requests an estimation or determination of a projection direction or an adjusted projection direction. The explicit indication may include, for example, a predefined gesture, a predefined voice command, or a combination thereof. By way of example and not limitation, the activation module 210 may enable the user 122 to predefine a gesture and/or a voice command, or select a gesture and/or a voice command from a plurality of gestures and/or voice commands to be stored in the view adjustment system 102 to indicate his/her desire for estimating or determining a projection direction or an adjusted projection direction. Examples of a predefined gesture or a voice command for an explicit indication that requests an estimation or determination of a projection direction or an adjusted projection direction may include, blinking an eye for at least a certain number of times such as three times in two seconds, moving a hand back and forth, turning the head left and right, uttering a command input such as "I am here", etc. In response to receiving an explicit indication from the user 122, the activation module 210 may directly instruct the view adjustment system 102 or a determination module 214 to perform an estimation or determination of a projection direction or an adjusted projection direction without performing the above operations such as determining that a viewing event may exist or likely exists, determining whether a demand or need for estimating or determining a projection direction or an adjusted projection direction is imminent, etc.

Upon determining whether a demand or need for estimating or determining a projection direction or an adjusted projection direction is imminent, the activation module 210 may instruct the view adjustment system 102 or the determination module 214 to perform an estimation or determination of a projection direction or an adjusted projection direction. A projection direction is a direction to which content displayed or to be displayed on the physical display 124 of the client device 104 is projected in a perspective view. In at least one embodiment, the projection direction to be estimated or determined may include a direction substantially or approximately along a line of sight or a direction substantially or approximately corresponding to an angle of view of the user 122 with respect to the physical display 124 or the client device 104. A line of sight may correspond to a line joining a center between two eyes of the user 122 and a specific point on the physical display 124 or the client device 104. The specific point may include, for example, a center of the physical display 124 or the client device 104, a center of the content displayed or to be displayed on the physical display 124 of the client device 104. Meanwhile, an angle of view corresponds to a set of one or more angles that define the line of sight between the user 122 and the physical display 124 or the client device 104.

In some embodiments, the projection direction to be estimated may alternatively include an estimation of a direction corresponding to a relative position of the user 122 with respect to the physical display 124 or the client device 104. For example, the projection direction to be estimated or determined may include a direction substantially or approximately along a line between a body part (e.g., a head, a nose, a mouth, a hand, etc.) of the user 122 and the physical display 124 or the client device 104.

In some instances, the one or more sensors 120 may or may not be located at a position that is the same as or close to the physical display 124 (e.g., the center of the physical display 124) or the client device 104 (e.g., the center of the client device 104). For example, the client device 104 may include a display device, such as a television, connected or associated with a motion detector or controller, such as an ultrasonic motion detector, a microwave motion detector, a passive (infrared) motion detector, a Kinect® motion controller, etc. In this case, the projection direction may include a direction along a line substantially or approximately joining between a body part, such as an eye, a mouth, a hand, etc. and a sensor 120. In some embodiments, the view adjustment system 102 may further include a learning module 216. The learning module 216 may be configured to calibrate the projection direction with direct user input or interaction, and to convert a projection direction that is determined based on data captured by the one or more sensors 120 to a projection direction that reflects a direction along a line between the user 122 and the physical display 124 or the client device 104.

By way of example, the learning module 216 may configure the client device 104 to present content on the physical display 124 to the user 122. The user 122 may be positioned at a certain relative location and/or direction from the physical display 124 and/or the client device 104. Upon presenting the content to the user 122, the learning module 216 may receive or detect a gesture of the user 122 via the one or more sensors 120. The gesture of the user 122 may include an indication of a correction to be made to a current direction to which the content is projected. The gesture of the user 122 may include a motion of a body part, such as a hand, an arm, a head, etc., of the user 122, a voice input, or a combination thereof. For example, the user 122 may input voice commands, such as "tilt up by 5 degrees", "rotate to the left by 10 degrees," etc., to indicate a correction to the current direction of projection of the content. As another example, the user 122 may move his/her hand from left to right to indicate that the content is to be projected at a new direction that is to the east of the current direction, etc. The learning module 216 may employ a transformation module 218 (which will be described in more detail hereinafter) to transform the content into a new perspective view according to the correction or the new direction, and configure the client device 104 to present the transformed content to the user 122. Depending on whether the user 122 is satisfied with a result of the transformed content, the learning module 216 may receive a new gesture from the user 122 to indicate a further correction to the new projection direction of the content.

In response to successfully calibrate the projection direction at one relative location or direction of the user 122, the learning module 216 may request the user 122 to repeat the above calibration process at one or more other locations or directions. The learning module 216 may repeat this calibration process until a predetermined number of repetitions is reached or until the learning module 216 receives an indication that the user 122 is satisfied with the calibration of the projection direction. The predetermined number of repetitions may be predefined by the view adjustment system 102 and/or the user 122. Examples of the predetermined number of repetitions may include three, five, ten, twelve, etc. Other techniques such as transfer learning (i.e., applying learning results in one environment to another one) may be applied to reduce the number of repetitions.

Additionally or alternatively, after receiving the user's consent, the learning module 216 may further record information of the user 122. For example, the learning module 216 may record height information, voice information (e.g., voice pattern of speech of the user 122, etc.), face size information, etc., of the user 122, and store the information of the user 122 in the memory 114. The view adjustment system 102 (or the determination module 214) may use this information for aiding in estimation or determination of the projection direction. In some embodiments, the view adjustment system 102 may estimate or determine the projection direction without calibrating the projection direction and/or recording the information of the user 122 in the first place. In another embodiment, in an event that the information of the user 122 is to be recorded, the learning module 216 may provide the user 122 an opportunity to opt out of sharing such information.

In at least one embodiment, prior to estimating or determining a projection direction, the determination module 214 may communicate with a monitoring module 220 to determine whether past information of the projection direction is recorded. For example, the monitoring module 220 may track changes in position, posture and/or direction of the user 122 with respect to the client device 104 and/or the physical display 124 via the one or more sensors 120, and record these tracked changes in the memory 114. By way of example and not limitation, the determination module 214 may check with the monitoring module 220 whether the monitoring module 220 has recorded changes that are within a predetermined period of time since the last or most recent estimation or determination of the projection direction. If the monitoring module 220 has such recorded changes, the determination module 214 may obtain information of these recorded changes from the monitoring module 220. The determination module 214 may estimate or derive the projection direction based on and/or with the help of the recorded changes. If no such recorded changes exist, the determination module 214 may determine or estimate the projection direction or the adjusted projection direction without using past information. In other embodiments, the determination module 214 may directly estimate or determine the projection direction or the adjusted projection direction without communicating with the monitoring module 220 for past information in the first place.

Regardless of whether the determination module 214 has communicated with the monitoring module 220 for the past information of changes in the position, posture and/or direction of the user 122 with respect to the client device 104 and/or the physical display 124, the determination module 214 may determine a projection direction or an adjusted projection direction via the one or more sensors and further based on one or more detection/estimation algorithms. By way of example and not limitation, the determination module 214 may obtain one or more images from an image sensor, such as an ultra-wide FOV camera or an array of cameras, etc., of the one or more sensors 120. The determination module 214 may employ an object recognition algorithm to recognize or detect a specific object (e.g., a face recognition or detection algorithm to recognize a face and/or one or more eyes of the user 122) from the one or more images. In response to recognizing or detecting the specific object (e.g., the eyes of the user 122), the determination module 214 may estimate or determine a line of sight or an angle of view of the user 122 based on a position of the recognized object in the images and/or the information, such as the face size information, etc., of the user 122 recorded by the learning module 216.

In at least one embodiment, if the image sensor used by the determination module 214 is a fisheye camera or an ultra-wide FOV camera, the determination module 214 may first correct or calibrate geometric distortions, e.g., radial distortion, perspective distortion, etc., that are inherited in the fisheye camera or the ultra-wide FOV camera. Details of a method for correcting or calibrating the geometric distortions of the fisheye camera or an ultra-wide FOV camera may be found at J. Kannala and S. S. Brandt, "A Generic Camera Model and Calibration Method for Conventional, Wide-angle, and Fish-eye Lenses," *IEEE Transaction on Pattern Analysis and Machine Intelligence*, volume 28, page 1335-134, Jun. 19, 2006. In some embodiments, due to the ultra-wide FOV of the fisheye lens in the fisheye camera, additional light sources may also be captured the fisheye camera, which may cause potential problems in determining positions of the face and/or the eyes of the user 122. As the face of the user 122 is not a light source, the determination module 214 may configure the fisheye camera to overexpose by one stop (based on the center-weighted with light measurement results of the fisheye camera) when capturing the images. The determination module 214 may further equalize the captured images using an auto-exposure technique, such as an automatic exposure correction method as described in L. Yuan and J. Sun, "Automatic Exposure Correction of Consumer Photographs," Proceedings of the $12^{th}$ European Conference on Computer Vision, volume Part IV, pages 771-785, 2012. Specifically, the determination module 214 may divide an image into regions with different exposure zones and estimate an optimal zone for each region while considering details, (such as pixel values, etc., in each zone and local contrast between neighboring zones or regions. The determination module 214 may then apply a detail-preserving S-curve-based adjustment that fuses global curve obtained from zone mapping with local contrast control. For example, the determination module 214 may apply an S-curve to an original image to change intensities associated with dark areas (e.g., shadows, etc.) and bright areas (e.g., highlights, etc.) to middle tones, such that the dark areas become lighter or brighter while bright areas become darker. The determination module 214 may then calculate local details of the original image by comparing the original image with a low-pass filtered version of the original image, and increase intensities of pixels that represent the details of the original image and/or pixels having intensities close to the middle tones. In other words, the determination module 214 employs the detail-preserving S-curve-based adjustment that assigns a higher weight to intensities of pixels that carry more details of the original image, thus making the image obtained after the detail-preserving S-curve-based adjustment to appear more natural.

For another example, the determination module 214 may detect or receive voice signals via an acoustic sensor (such as an array of microphones, for example) of the one or more sensors 120. In some embodiments, the determination module 214 may further verify or recognize that the voice signals are originated from the user 122 based on a comparison of the voice signals to the information (e.g., the voice pattern) of the user 122 recorded by the learning module 216, for example. Upon detecting or receiving the voice signals, the determination module 214 may estimate a relative location and/or a relative direction of a source (i.e., the user 122 or the mouth of the user 122 in this example) of the voice signals based on a sound localization algorithm. Examples of the sound localization algorithm may include, for example, a cross-correlation algorithm, a cross-correlation derivative algorithm, a spatial-gradient algorithm, a stereausis algorithm.

Additionally or alternatively, the determination module 214 may detect a motion associated with the user 122 (e.g., a head movement of the user 122, etc.) via a motion sensor of the one or more sensors 120. The determination module 214 may estimate a relative location and/or a relative direction of a source (e.g., the head of the user 122 in this example) of the motion based on a motion detection algorithm. For example, the determination module 214 may employ a motion detection algorithm that subtracts two consecutive motion images captured by the motion sensor to obtain a residual image, and detects edges in the residual image. Since the background or environment around the user 122 captured by the motion sensor is generally static, the determination module 214 may treat salient and locally clustered edges (or a cluster of locally salient edges) as an indication of a location of a moving face or body part of the user 122. In an event that the residual image includes a number of clusters of locally salient edges, the determination module 214 may select a cluster from these clusters of locally salient edges as an indication of the location of the moving face or body part of the user 122. Examples of selecting the cluster may include selecting a cluster having the maximum number of locally salient edges, selecting a cluster having the maximum total intensity value associated with the locally salient edges, etc. As another example, the determination module 214 may employ a motion detection algorithm that finds salient points in two consecutive images and performs a matching among the salient points. The determination module 214 may estimate the motion based on a magnitude and/or a direction of matching vectors (or motion vectors) among the salient points.

Additionally or alternatively, the determination module 214 may detect a presence of the user 122 via a proximity sensor of the one or more sensors. The determination module 214 may estimate a relative location and/or a relative direction of the user 122 based on a proximity search algorithm. For example, the determination module 214 may employ multiple proximity sensors and estimate a relative location and/or a relative direction of the user 122 based on trilateration or triangulation of location information captured by the multiple sensors. In some instances, the determination module 214 may estimate or determine the projection direction to which the content displayed or to be displayed on the physical display 124 based on a combination of the sensors (e.g., the image sensors, the motion sensor, the acoustic sensor and/or the proximity sensor, etc.) as described above. In at least one embodiment, the determination module 214 may further estimate or determine the projection direction based on one or more prediction algorithms. For example, the determination module 214 may employ an angle-based prediction algorithm and/or a motion-based prediction algorithm, etc.

In at least one embodiment, if a triggering event or change is caused by a change in an attitude or motion state of the physical display 124, e.g., during "hand-held" situation, the determination module 214 may exploit a relative change in an orientation of the physical display 124. The determination module 214 may obtain the relative change in the orientation of the physical display 124 from the monitoring module 220 and/or via the low-power sensor, such as the IMU sensor, of the one or more sensors 120. The determination module 214 may then employ an angle-based prediction algorithm to determine or estimate the projection direction.

Figure 3:
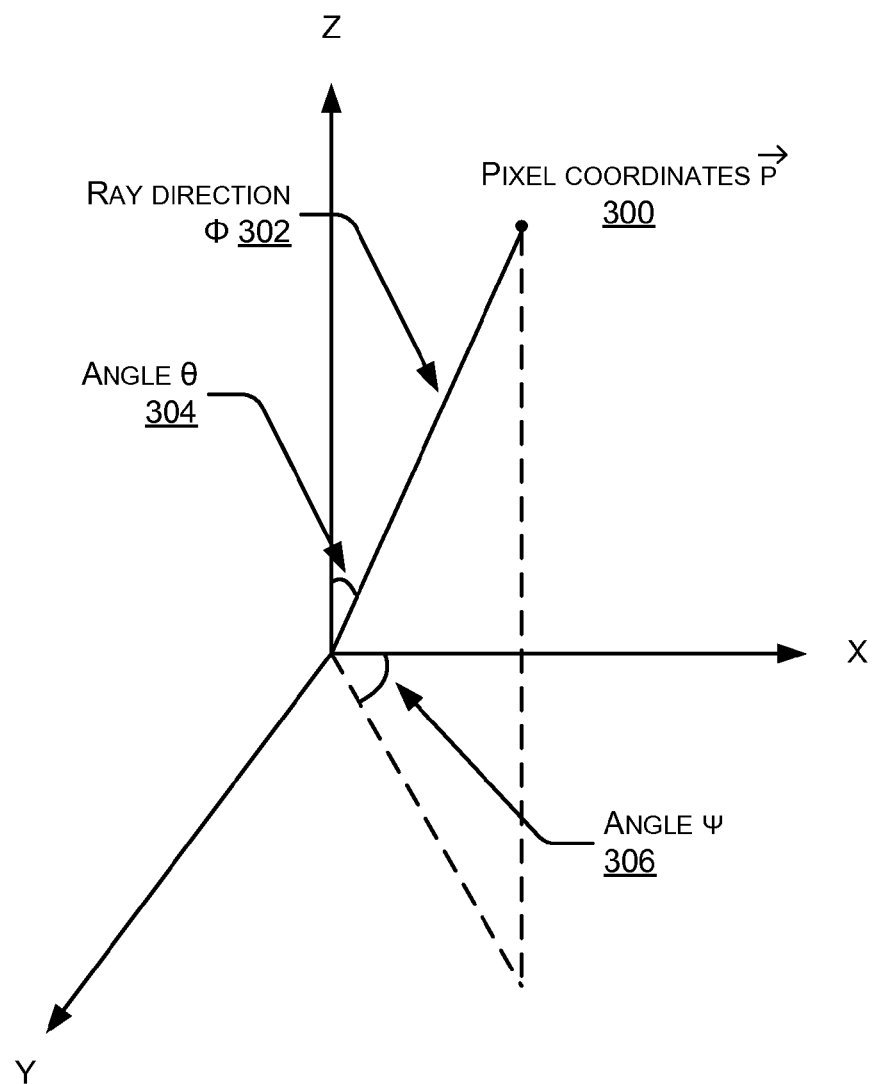
FIG. 3 illustrates an example coordinate system used by the view adjustment system.

FIG. 3 shows pixel coordinates $\vec{p}$ 300 and ray direction Φ 302 in a lens coordinate system C 304. Given the pixel coordinates $\vec{p}$ 300 and the ray direction Φ 302, the determination module 214 may compute or obtain two angles, angle θ 304 and angle ψ 306 associated with the ray direction Φ 302. If a coordinate system of the client device 104, or the lens coordinate system C 304, changes to C' due to at least one of a pitch, a yaw and/or a roll action, and if an origin of the coordinate system of the client device 104 does not change, the determination module 214 may determine new pixel coordinates of $\vec{p}$ of ray direction Φ based on new values of the angles θ 304 and ψ 306, which are angles between Φ and new z-axis and x-axis of the new coordinate system C' respectively.

In order to calculate new values of the angles θ 304 and ψ 306, the determination module 214 may measure Euler angles for the pitch, yaw and/or roll actions associated with the relative change in the orientation of the client device 104 via the low-power sensors (such as accelerometer and/or the compass) of the one or more sensors 120. The determination module 214 may then estimate or determine the new projection direction (i.e., the new values of the angles θ 304 and ψ 306) based on the measured Euler angles. For example, given a previous image and a current image captured by an image sensor of the one or more sensors 120, the determination module 214 may generate a prediction window based on a face detected in the previous image. The determination module 214 may map previous positions of left and right eyes in the previous image to new positions of the left and right eyes in the current image and set a size of the prediction window heuristically with a width and a height based on a separation between the left and right eyes in the current image. For example, the determination module 214 may set the width of the prediction window as a distance between the left and right eyes in the current image and the height as the distance between the left and right eyes in the current image multiplied by a factor such as 4/3, for example.

In some embodiments, the determination module 214 may determine the projection direction based on a motion-based prediction algorithm. For example, the physical display 124 may be put away from the user 122, such as on a table next to the user 122. In such situations, the physical display 124 may be in a stationary state, i.e., being still. On the other hand, the user 122 may be moving slightly or significantly while the environment or the background associated with the user 122 may remain generally stationary. In this case, the determination module 214 may perform motion detection to identify potential face areas based on consecutive images captured by the image sensor (such as a fisheye camera or an array of cameras, etc.). In at least one embodiment, the determination module 214 may employ an integral-subtraction image-based prediction scheme to estimate the projection direction. In this integral-subtraction image-based prediction scheme, the determination module 214 may subtract two consecutive images in a pixel-wise fashion and obtain a subtraction image, where objects/parts that are in motion may have large pixel values in the subtraction image and objects/parts that are still or substantially stationary may have zero or small pixel values. The determination module 214 may then compute an integral image based on the subtraction image. Thereafter, the determination module 214 may traverse a sliding window through the integral subtraction image and compute a sum of pixel values within the sliding window at each pixel of the integral subtraction image. The determination module 214 may employ one or more pixels that have maximum sum values, i.e., those pixels corresponding to a motion area in the images, as a prediction for displacement of the face area between the two consecutive images. The determination module 214 may then estimate or determine the projection direction based on the predicted displacement and the recorded information of the face size, for example.

After estimating or determining the projection direction by the determination module 214, the view adjustment system 102 or the transformation module 218 may transform or project the content displayed or to be displayed on the physical display 124 into a perspective view based on the estimated or determined projection direction. In at least one embodiment, the transformation module 218 may transform or project the content displayed or to be displayed on a two-dimensional plane with a normal thereof being parallel to the estimated or determined projection direction. The transformation module 218 may perform the transformation or projection of the content into a new perspective view using a perspective transformation or projection algorithm.

Figure 4:
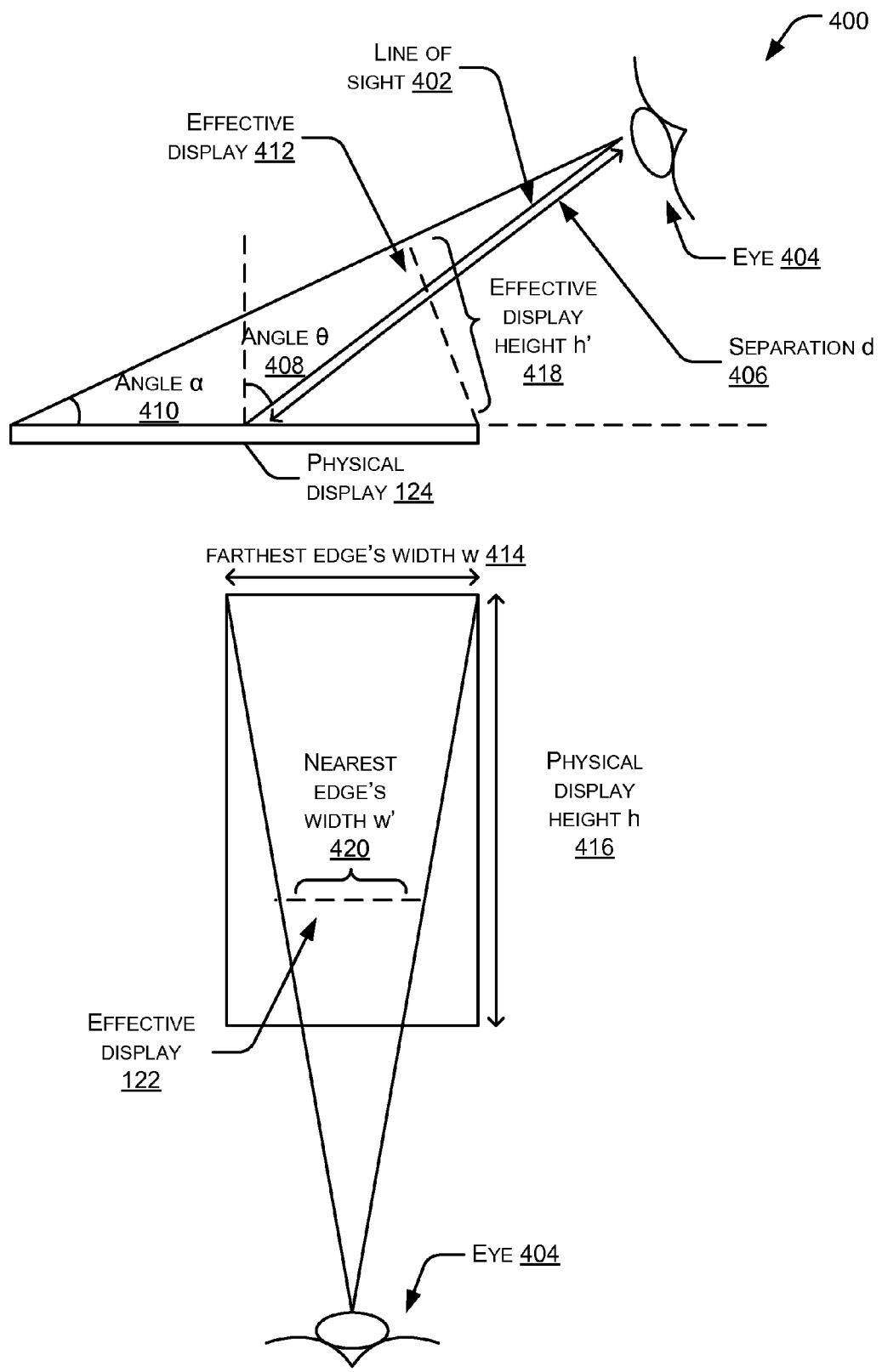
FIG. 4 illustrates an example scenario illustrating a line of sight between a display of a client device and an eye of a user.

In some embodiments, during or after transforming or projecting the displayed content into the new perspective view, the transformation module 218 may further correct distortion due to the perspective transformation or projection. By way of example and not limitation, FIG. 4 shows an example scenario 400 illustrating a line of sight 402 between the physical display 124 of the client device 104, a physical display, and an eye 404 of the user 122. The line of sight 402 has a distance or separation measurement d shown at 406, the distance or separation between the eye of the user 404 and the physical display 124 of the device. θ represents an angle of view 408 from a normal at the center of the physical display 124. α represents an angle 410 between the physical display 124 and the eye 404 of the user 122 at a farthest center point of the physical display 124, an can be derived based on θ and d. Due to perspective distortion, an effective display 412, which is perpendicular to the line of sight 402 connecting the eye 404 and the center of the physical display 124, has a shape of a trapezoid. In order to generate a normal looking image on the effective display 412, the transformation module 218 may estimate or compute a size of the effective display 412. In at least one embodiment, the transformation module 218 may set a width 414 of an edge of the effective display 412 that is farthest from the eye 404 to be the same as a width, w, of the physical display 124 of the client device 104. If h represents a height 416 of the physical display 124 of the client device 104, the transformation module 218 may determine or compute a height 418, h', of the effective display 412 and a width 420, w', of an edge of the effective display 412 that is nearest to the eye 404 based on the following equations:

$$h' = h \cdot \frac{\sin\alpha}{\sin(\pi - \theta - \alpha)} \quad (1)$$

$$w' = w \cdot \frac{d \cdot \sin\theta - h/2 + h' \cdot \cos\theta}{d \cdot \sin\theta + h/2} \quad (2)$$

Upon determining or computing the height' 418, farthest width 414 and nearest width 420 of the effective display 412, the transformation module 218 may transform or project the content and change a size of the content to be a same size of the effective display 412 within the physical display 124 of the client device 104. In at least one embodiment, the transformation module 218 or the view adjustment system 102 may configure the client device 104 to present the transformed content on the physical display 124 to the user 122.

In at least one embodiment, the monitoring module 220 may monitor, detect or track changes in relative motion, position and/or direction between the user 122 (or a body part of the user 122) and the physical display 124 or the client device 104. Additionally or alternatively, the monitoring module 220 may monitor, detect or track changes in operation modes of the physical display 124 and/or the client device 104. The monitoring module 220 may determine whether a re-estimation or re-determination for a new projection direction or an adjusted projection direction is imminent based on the one or more policies or rules 212 and the changes that are detected. If determining that a new projection direction or an adjusted projection direction is to be estimated or determined, the monitoring module 220 may instruct the determination module 214 to estimate or determine a new projection direction or an adjusted projection direction as described in the foregoing embodiments. If the monitoring module 220 determines that no new projection direction or an adjusted projection direction is to be estimated or determined, the monitoring module 220 may continue to monitor, detect or track changes as described above and store information associated with the changes that have been monitored or detected in memory, e.g., other program data 118.

Examples of Methods

Figure 5:
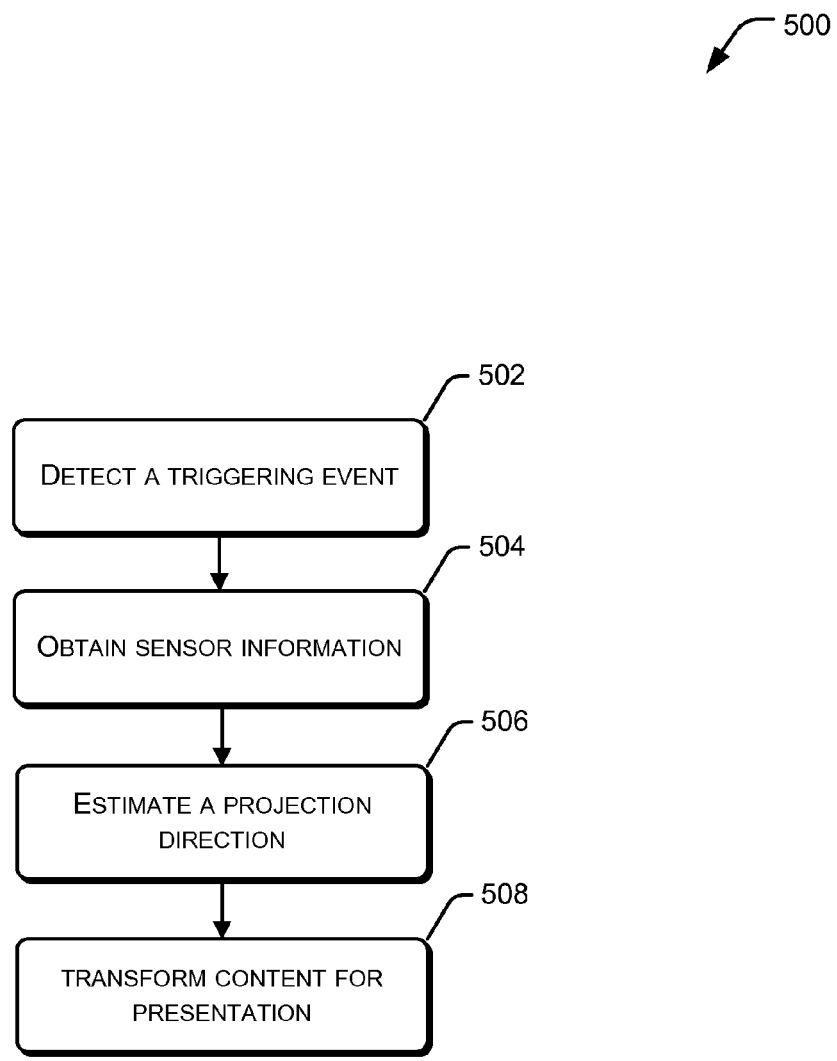
FIG. 5 illustrates an example method of view adjustment.
Figure 6:
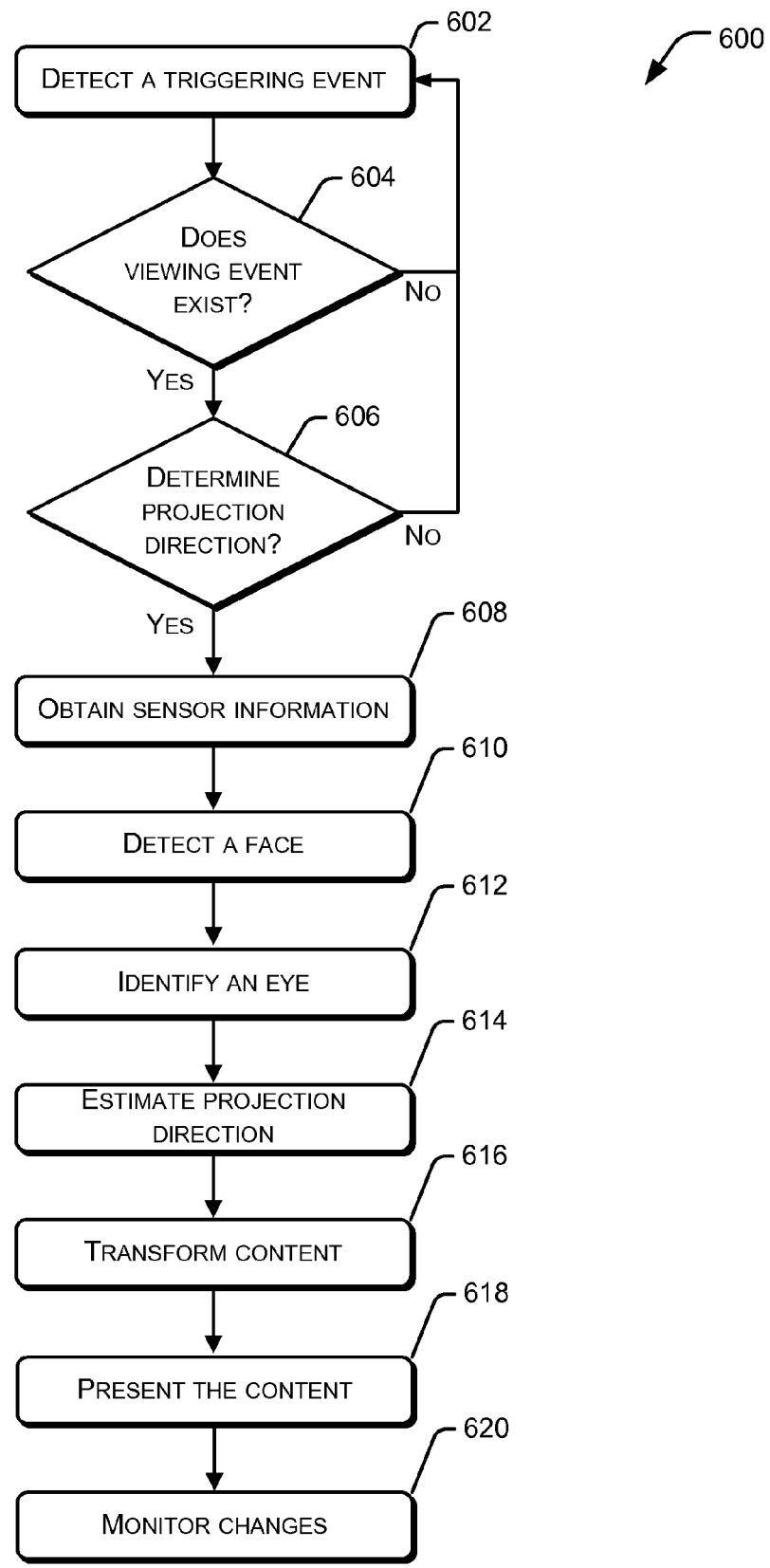
FIG. 6 illustrates an example method of view adjustment.
Figure 7:
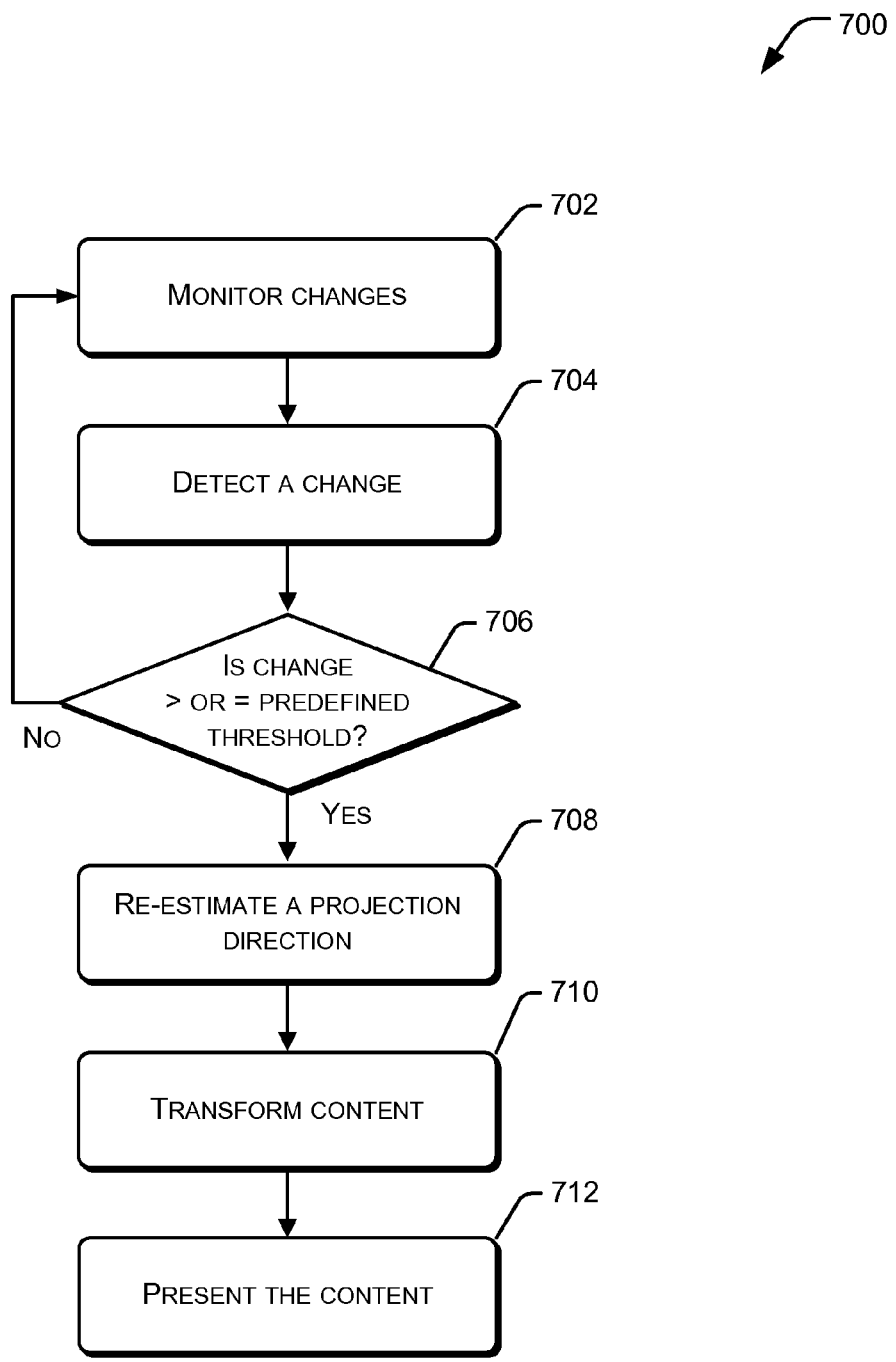
FIG. 7 illustrates an example method of view adaptation in response to a change in a viewing condition.

FIGS. 5 and 6 are flow charts depicting example methods 500 and 600 of view adjustment. FIG. 7 is a flow chart an example method 700 of view adaptation in response to a change in a viewing condition. The methods of FIGS. 5, 6, and 7 may, but need not, be implemented in the environment of FIG. 1 and using the device of FIG. 2. For ease of explanation, methods 500, 600 and 700 are described with reference to FIGS. 1 and 2. However, the methods 500, 600, and 700 may alternatively be implemented in other environments and/or using other systems.

Methods 500, 600, and 700 are described in the general context of computer-executable instructions. Generally, computer-executable instructions can include routines, programs, objects, components, data structures, procedures, modules, functions, and the like that perform particular functions or implement particular abstract data types. The method can also be practiced in a distributed computing environment where functions are performed by remote processing devices that are linked through a communication network. In a distributed computing environment, computer-executable instructions may be located in local and/or remote computer storage media, including memory storage devices.

The example methods are illustrated as collections of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the methods without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring to FIG. 5, at block 502, the view adjustment system 102 detects a triggering event. The triggering event may include, for example, receiving content to be displayed, a change in an attitude or orientation of the client device 104 or the physical display 124, or any triggering event as described in the foregoing embodiments, etc. The view adjustment system 102 may detect the triggering event while in an active mode and/or an inactive mode (e.g., an "off" mode). In some embodiments, if the view adjustment system 102 is in an active mode, for example, when the display 124 is turned on, the view adjustment system 102 may further employ the one or more sensors 120 to continuously or periodically monitor the triggering event and/or changes associated with a relative location and/or a relative direction of the user 122 with respect to the display 124 and/or the device 104.

At block 504, upon detecting the triggering event, the view adjustment system 102 may obtain sensor information from the one or more sensors 120.

At block 506, the view adjustment system 102 may estimate or determine a projection direction based on the sensor information from the one or more sensors. The projection direction corresponds to a normal of a two-dimensional plane on which content displayed on the display 124 is to be projected.

At block 508, the view adjustment system 102 may transform or project content displayed or to be displayed on the physical display 124 of the client device 104 into a perspective view for presentation based on the estimated projection direction. For example, the view adjustment system 102 may transform or project the content on a two-dimensional plane that is normal or perpendicular to the estimated projection direction.

Referring to FIG. 6, at block 602, the view adjustment system 102 may detect a triggering event. The triggering event may include, for example, receiving new content to be displayed, a change in an attitude or orientation of the client device 104 or the physical display 124, or any triggering event as described in the foregoing embodiments, etc. The view adjustment system 102 may detect the triggering event while in an active mode and/or an inactive mode. In some embodiments, if the view adjustment system 102 is in an active mode, for example, when the display 124 is turned on, the view adjustment system 102 may further employ the one or more sensors 120 to continuously or periodically monitor the triggering event and/or changes associated with a relative location and/or a relative direction of the user 122 with respect to the display 124 and/or the device 104.

At block 604, the view adjustment system 102 may determine whether a viewing event exists or likely exists based on information captured by one or more low-power sensors (e.g., the accelerometer, the compass, the light sensor, the proximity sensor, etc.). If the view adjustment system 102 determines that no viewing event exists or likely exists, the view adjustment system 102 may wait for another triggering event for further operation.

At block 606, in response to determining that a viewing event exists or likely exists, the view adjustment system 102 may determine whether a demand or need for estimating or determining a new projection direction (e.g., a new angle of view or a new line of sight from the user 122 to the display 124, for example) is imminent based on a predetermined set of policies or rules 212. If the view adjustment system 102 determines that a new projection direction is not to be estimated or determined, the view adjustment system 102 may wait for another triggering event for further operations.

At block 608, upon determining that a demand or need for estimating or determining a new projection direction is imminent, the view adjustment system 102 may obtain sensor information from the one or more sensors 120.

At block 610, the view adjustment system 102 may detect a face of a user 122 using an image sensor of the one or more sensors 120.

At block 612, the view adjustment system 102 may identify one or more eyes of the user 122 from the detected face.

At block 614, the view adjustment system 102 may estimate or determine a projection direction (e.g., an angle of view and/or a line of sight) between one eye (or a center of the two eyes) of the user 122 and a surface of the display 124.

At block 616, the view adjustment system 102 may transform or project content displayed or to be displayed on the display 124 of the client device 104 into a perspective view based on the estimated projection direction (e.g., the estimated angle of view and/or the estimated line of sight). For example, the view adjustment system 102 may transform or project the content displayed on the display 124 on a two-dimensional plane that is perpendicular to the estimated projection direction. As another example, the view adjustment system 102 may transform or project the perspective view into a view as if the user 122 looks at the content displayed on the display 124 of the client device 104 from a direction normal to a surface of the display 124.

At block 618, the view adjustment system 102 may configure the client device 104 or the physical display 124 to present the transformed content in the perspective view to the user 122.

At block 620, the view adjustment system 102 may monitor or track changes in the angle or view or the line of sight between the user 122 and the display 124. For example, the view adjustment system 102 may monitor or track changes in relative position and/or direction of the user 122 with respect to the display 124 via the one or more sensors 120.

Referring to FIG. 7, at block 702, the view adjustment system 102 may monitor for or track changes in an angle or view or a line of sight between the user 122 and the physical display 124. For example, the view adjustment system 102 may monitor or track changes in relative position and/or direction of the user 122 with respect to the physical display 124 via the one or more sensors 120.

At block 704, the view adjustment system 102 detects a change in the angle of view or the line of sight.

At block 706, the view adjustment system 102 determines whether the change in the angle of view or the line of sight is greater than or equal to a predetermined threshold. If the change in the angle of view or the line of sight is not greater than or equal to the predetermined threshold, the view adjustment system 102 may continue to monitor for or track changes associated with relative position and/or direction of the user 122 with respect to the physical display 124.

At block 708, in response to detecting that the change in the angle of view or the line of sight is greater than or equal to the predetermined threshold, the view adjustment system 102 may re-estimate or re-determine a new projection direction based on the detected change, for example.

At block 710, after obtaining the new projection direction, the view adjustment system 102 may transform or project the content displayed on the display to a new perspective view that is obtained based on the new projection direction.

At block 712, the view adjustment system 102 presents the content in the new perspective view to the user 122.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although embodiments have been described in language specific to structural features and/or methodological acts, it is to be understood that the claims are not necessarily limited to the specific features or acts described. Rather, the specific features and acts are disclosed as exemplary forms of implementing the claimed subject matter.

What is claimed is:

1. A system comprising:
   at least one processor;
   memory operatively coupled to the at least one processor;
   a first sensor operatively coupled to the at least one processor;
   a second sensor operatively coupled to the at least one processor;
   a display operatively coupled to the at least one processor;
   a detection module stored in the memory and executable by the at least one processor to estimate an angle of view between an eye of a user and a surface of the display
   a transformation module stored in the memory and executable by the at least one processor to transform content for display by the display into a perspective view, the perspective view projecting the content into a plane perpendicular to a line of sight of the user based at least on the estimated angle of view;
   a display module stored in the memory and executable by the at least one processor to cause presentation of the content in the perspective view on the display; and
   a view adjustment module stored in the memory and executable by the at least one processor to:
      determine whether the system is being used in a hand-held state or an off-the-body state;
      determine that a condition for estimating the angle of view is satisfied, the condition being associated with one of the hand-held state or the off-the-body state, wherein determining that the condition for estimating the angle of view is satisfied includes:
         in response to determining that the system is in the hand-held state, determining that input received from the first sensor indicates a change in orientation of the device greater than or equal to a threshold change in orientation, the threshold change in orientation being greater than zero change in orientation; and
         in response to determining that the system is in the off-the-body state, determining that input received from the second sensor of the device indicates a change in light incident the display of the device greater than or equal to a threshold change in light incident the display, the threshold change in light incident the display being greater than zero change in light incident the display;
      based at least on determining that the condition is satisfied, trigger the transformation module to re-transform the content for display based at least on the threshold change in orientation or the threshold change in lights.

2. The system of claim 1, wherein the image sensor comprises at least one of a fisheye camera, a wide field-of-view camera, or an array of cameras.

3. A device comprising:
a processor;
an accelerometer;
a light sensor;
a display; and
a memory having stored thereon instructions executable by the at least one processor that, when executed by the at least one processor, configure the system to perform operations including:
  determining whether the device is being used in a hand-held state or an off-the-body state;
  determining that a condition for estimating an angle of view is satisfied, the condition being associated with one of the hand-held state or the off-the-body state, wherein determining that the condition for estimating the angle of view is satisfied includes:
    in response to determining that the device is in the hand-held state, determining that input received from the accelerometer of the device indicates a change in orientation of the device greater than or equal to a threshold change in orientation, the threshold change in orientation being greater than zero change in orientation; and
    in response to determining that the device is in the off-the-body state, determining that input received from the light sensor of the device indicates a change in light incident the display of the device greater than or equal to a threshold change in light incident the display, the threshold change in light incident the display being greater than zero change in light incident the display;
  in response to determining that the condition is satisfied, estimating the angle of view between a user and the display of the device; and
  transforming content displayed on the display of the device into a perspective view based at least on the estimated angle of view.

4. The device of claim 3, further comprising presenting the content in the perspective view to the user.

5. The device of claim 4, further comprising monitoring the angle of view between the user and the display of the device.

6. The device of claim 3, wherein the transforming comprises projecting the content on a two-dimensional plane that is perpendicular to a line of sight of the user that is determined based on the estimated angle of view.

7. The device of claim 3, wherein the device comprises a computing device, a mobile device, or a display device.

8. The device of claim 3, further comprising:
detecting a change in the angle of view between the user and the display of the device; and
adjusting the perspective view based on the change in the angle of view.

9. The device of claim 3, wherein the condition comprises at least one of:
the display being turned on;
the user using the device; or
the user being within a predefined proximity of the device.

10. The device of claim 3, wherein the estimating comprises:
detecting, by a sensor, a face of the user;
identifying an eye of the user from the detected face;
determining a line of sight from the eye of the user to the display of the device; and
determining the angle of view based on the estimated line of sight.

11. The device of claim 10, wherein the sensor comprises at least one of a fisheye camera, a wide field-of-view camera, or an array of cameras.

12. The device of claim 3, wherein the angle of view corresponds to an angle between a line of sight from the user and a plane parallel to a surface of the display of the device.

13. One or more computer storage media storing executable instructions that, when executed by one or more processors, cause the one or more processors to perform acts comprising:
receiving input from a first sensor;
detecting a change in a viewing condition based at least in part on the input received from the first sensor;
determining whether the change in the viewing condition is greater than, equal to, or less than a predetermined threshold;
in response to determining that the change in the viewing condition is less than the predetermined threshold, maintaining a projection direction for displaying content on a display;
in response to determining that the change in the viewing condition is greater than or equal to the predetermined threshold:
  obtaining input from a second sensor different than the first sensor, wherein the second sensor comprises a fisheye camera or a wide field-of-view camera;
  determining a line of sight from a user to the display based on the input obtained from the second sensor; and
  transforming content displayed on the display into a perspective view that projects the content into a plane substantially perpendicular to the line of sight from the user.

14. The one or more computer storage media of claim 13, the acts further comprising providing the content in the perspective view for presentation to the user.

15. The one or more computer storage media of claim 13, the acts further comprising determining that a condition for determining the line of sight is satisfied.

16. The one or more computer storage media of claim 15, wherein the condition comprises at least one of:
the display being turned on;
the user using a device of the display;
the user being within a predefined proximity of the display; or a change in an amount of light incident on the device of the display.

17. The one or more computer storage media of claim 13, the acts further comprising adjusting the input based on one or more distortions associated with the fisheye camera or the wide field-of-view camera.

18. The one or more computer storage media of claim 13, wherein the first sensor consumes less power than the second sensor.

19. The one or more computer storage media of claim 13, wherein the first sensor comprises at least one of a light sensor, a proximity sensor, an accelerometer, or a compass.

* * * * *